L. SPISELMAN.
SLICING MACHINE.
APPLICATION FILED NOV. 14, 1921.

1,418,104.

Patented May 30, 1922.
2 SHEETS—SHEET 1.

Inventor
Louis Spiselman
By his Attorneys
Mock & Blum

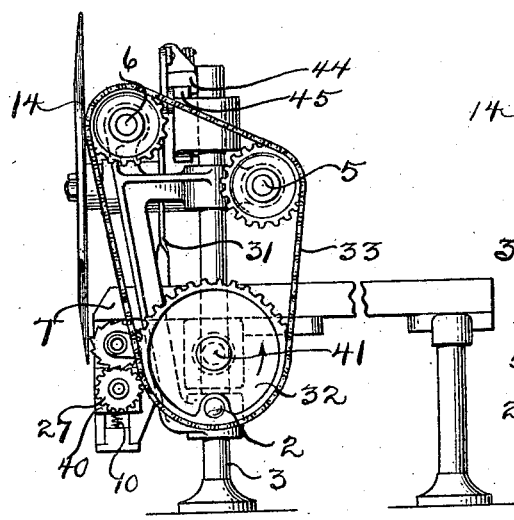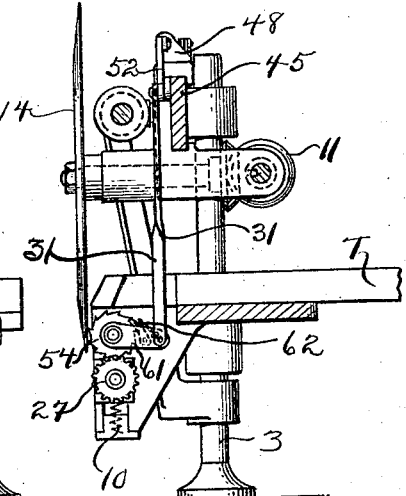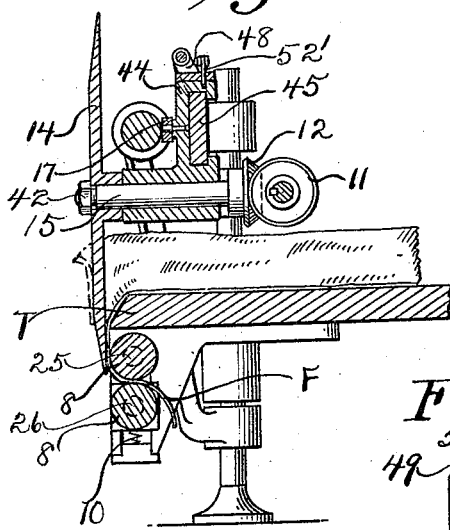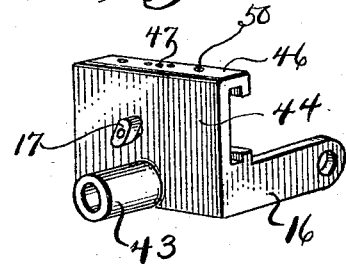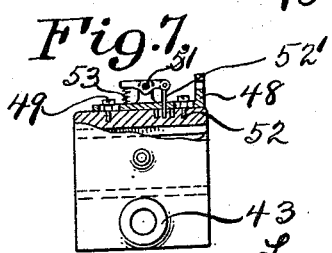

UNITED STATES PATENT OFFICE.

LOUIS SPISELMAN, OF BROOKLYN, NEW YORK.

SLICING MACHINE.

1,418,104.   Specification of Letters Patent.   Patented May 30, 1922.

Application filed November 14, 1921. Serial No. 514,891.

*To all whom it may concern:*

Be it known that LOUIS SPISELMAN, a citizen of Russia, residing at 1610 St. Marks Avenue, Brooklyn, in the county of Kings and State of New York, has invented certain new and useful Improvements in Slicing Machines, of which the following is a specification.

My invention relates to a new and improved form of slicing machine.

One of the objects of my invention is to provide a new and improved slicing machine which is especially adapted to slicing smoked salmon and similar articles.

Another object of my invention is to provide a slicing machine by means of which the flesh of the fish can be cut into thin slices, without injuring or touching the skin of the fish.

Another object of my invention is to provide a slicing machine in which the fish or other article to be sliced is automatically fed forward, while slices of regulated thickness can be cut therefrom.

Another object of my invention is to provide a slicing machine in which the cuts can be made by means of a revolving and reciprocating motion.

Other objects of my invention will be set forth in the following descriptions and drawings which illustrate a preferred embodiment thereof.

Fig. 3 is a side view with some of the parts removed for illustrating my invention with greater clearness.

Fig. 4 is a section along the line 4—4 of Fig. 1.

Fig. 5 is a section along the line 5—5 of Fig. 1.

Fig. 6 is a perspective view of the slide.

Fig. 7 is a detail view of the slide, partially in section.

Figure 1:
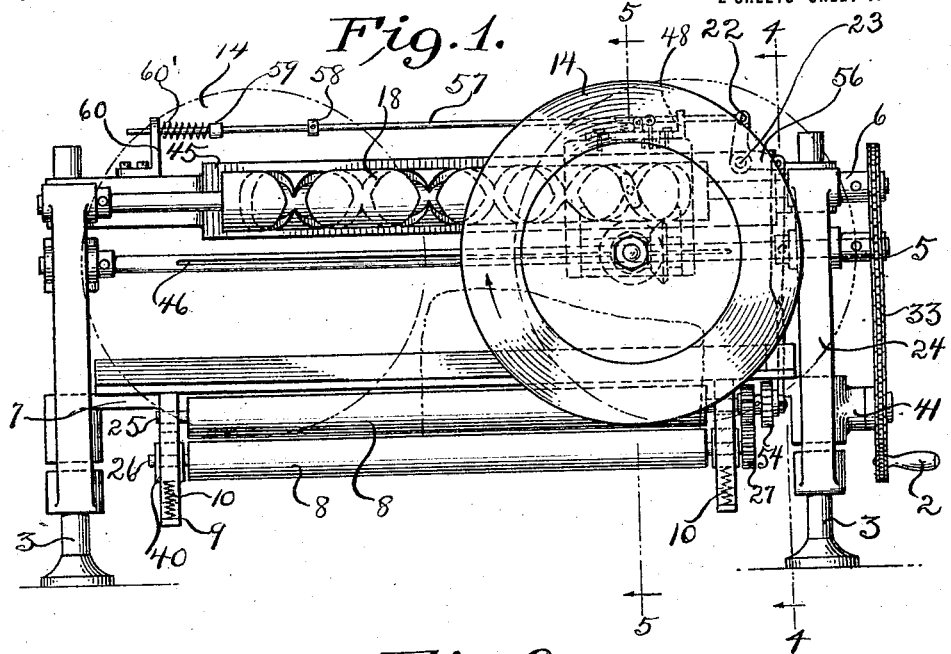
Fig. 1 is a front view.

According to my invention, and as shown more particularly in Fig. 5, two feed rollers, 8—8, having ends 25—26 of smaller diameter, and mounted in suitable bearings, are employed for automatically feeding the fish or other article forward with respect to the cutting means. A satisfactory machine for slicing smoked salmon for example, has hitherto not been developed, but according to my method, the tail end of the fish which consists substantially of skin with practically no flesh, is led through the feed rollers, so that the flesh is presented substantially parallel to the knife 14, whereby the knife slices away the flesh from the skin, but without injuring it. By this arrangement and location of the parts, the skin F of the fish can be led continuously through the feed rollers while the flesh is sliced off therefrom.

The device has two standards 3, having brackets, B, at the upper ends thereof. At the lower ends of the standards, 3, brackets 7 are suitably fixed thereto, and these brackets have depending arms 9, in which the ends 25—26 of the feed rollers 8, are mounted. The ends 25 of the upper feed roller 8, are mounted in ordinary bearings so that the said upper feed roller 8 has an ordinary revolving motion, while the ends 26 of the lower bearings are mounted in slides 40, which are pushed upwardly by means of springs 10, so that the two feed rollers 8 are always pushed together, with a certain amount of pressure, depending upon the force of the springs 10.

In order to properly slice the fish or other article, the said feed rollers 8 must be given an intermittent revolving movement, while the knife 14 is simultaneously revolved and moved to and fro. The said knife 14 is moved towards the fish when the cut or slice is to be made, and then moved away from and out of engagement with the fish, while the feed rollers communicate the intermittent feeding motion to the fish.

Figure 2:
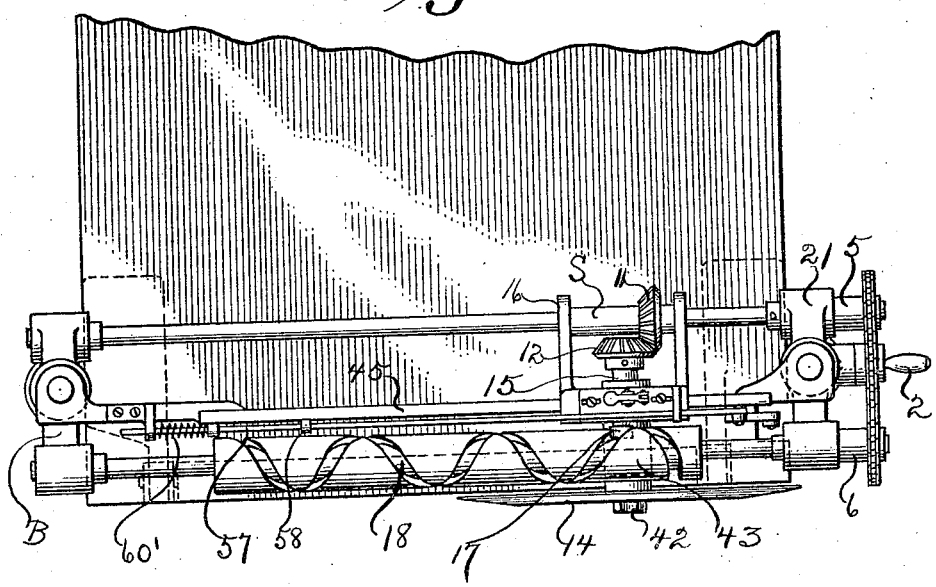
Fig. 2 is a top view.

It is preferable that the knife 14 should not be parallel to the axes of the rollers 8, but should be inclined at a slight angle, about 10°, in order to prevent any binding or friction. This is not clearly shown in Fig. 2 because of the smallness of this angle. Of course the knife 14 at no time touches the feed rollers 8, but is sufficiently spaced therefrom to allow the skin F to pass in front of the said rollers 8, without being cut.

The hand wheel 32, having a crank 2, and provided with spur teeth, is mounted upon a shaft 41, which is suitably secured to a standard 3. The chain 33 meshes with the said wheel 32, and it also meshes with spur gears mounted upon the lower shaft 5 and the upper or cam shaft 6. The upper cam shaft 6 is provided with a spiral cam groove 18, as is clearly shown in Fig. 1 and 2. The lower shaft 5 is provided with a sleeve S, that is keyed thereto by any suitable means, so that the said sleeve S is compelled to revolve with said lower shaft 5, but is free to move longitudinally thereon. The said sleeve S is provided with a bevel gear 11, which revolves with the shaft 5. Said bevel gear 11 meshes with a gear 12, mounted at the end of a shaft 15, upon which the knife 14 is mounted in position by means of a suitable nut 42. The shaft 15 is mounted in a bearing 43, located along the middle line of a slide 44 which is adapted to move to and fro on a guide 45, which is behind and at the same level as the shaft 5, as is shown in Fig. 1 and more clearly shown in Fig. 2. The said slide 44 has arms 16, which are perforated so as to form a bearing for shaft 5 and a fork to carry the sleeve S. The slide 44 is provided with a shoe or pin 17, that cooperates with a cam slot 18. Hence as the gears are actuated, the knife 14 is simultaneously revolved and is also reciprocated along the entire length of the cam slot 18 of the cam shaft 6. As clearly seen in Fig. 1, the shaft 5 is slotted at 46 in order to permit the sleeve S to be keyed thereto, as before mentioned. The two extreme positions of the knife 14 are shown in full lines and in dotted lines in Fig. 1.

The bell crank lever 22 is pivoted at 23 to member 45 connected to standards, and it can be revolved counter-clockwise, to a regulated extent, by the movement of the slide 44. This is accomplished more particularly by the parts shown in Fig. 1 and 7. A rod 57 is slidably mounted in brackets 60, which are connected with the cross member 45. This rod has an adjustable head 58 secured thereto, and it also has a head 59 which is acted upon by a compression spring 60', so that the normal position of the parts is as indicated in Fig. 1.

As clearly shown in Fig. 7, the slide 44 has a head 48 adjustably secured thereto. Like members 49, are secured to holes 50 of the slide 44, so as to limit the movement of the slide 48, which can only slide to and fro to a regulated degree with respect to the slide 44. The head 48 has a pin 52' pivotally secured to a vertical arm thereof, by means of a substantially horizontal lever pivotally secured at 51 and kept in the position shown in Fig. 7 by the compression spring 53. The pin 52', fits into one of a series of holes, 47, shown clearly in Fig. 6, and hence the head 48 can be adjustably secured to the head 44.

It is obvious that as the head is moved to the left, so as to assume the position shown on dotted lines in Fig. 1, that when the knife 14 no longer touches the flesh of the fish, that the lever 56 is revolved to a degree depending upon the adjustment of the head 48, by means of connection 22 with rod 57. As clearly shown in Fig. 4, the lever 56 is secured to a bent rod 31, and this is pivotally secured to an arm 61, having a pawl 62 connected therewith, so as to cooperate with the ratchet wheel 54. The arm 62 has the same center of revolution as the shaft of the upper feed roller and it is obvious that by the mechanism before described, that the ratchet wheel 54 is intermittently revolved to a greater or less extent, so as to intermittently move the rollers 8. It is also obvious that if the said intermittent feeding is small, that thin slices will be cut, and if the said intermittent feeding is large, that thick slices will be cut.

The operation of my machine is as follows: The thinner tail end of the fish is led between the feed rollers 8, and then by operating the handle 2, the fish is intermittently fed forward, the skin thereof remains untouched, while slices of greater or less thickness are severed therefrom.

I described a preferred embodiment of my invention, but it is clear that numerous changes and omissions can be made without departing from its spirit.

Of course the fish or other object to be sliced rests upon the table T, while the slices are being cut therefrom.

I claim:—

1. In a machine for slicing fish, means for engaging the skin of the said fish and feeding the same, and cutting means adapted to cut the flesh of the said fish into slices and means for operating the said cutting means, so that the skin of the said fish is substantially untouched.

2. In a slicing machine, movable feeding means adapted to engage and to forwardly feed the article to be sliced, movable cutting means for actuating said feeding means, and means adapted to actuate the said cutting means so that they cooperate to successively cut slices from only a portion of the article fed through the slicing machine, whereby a portion of said article remains untouched after its passage through the said slicing machine.

3. In a slicing machine having a table, feeding means located below the said table and adapted to feed the object to be sliced so that part thereof is bent at an angle to the said table, and cutting means laterally spaced from and adapted to operate below the said table and means for operating said cutting means and the said feeding means.

4. In a slicing machine, the combination of a revoluble cutting knife, feed rollers adapted to engage the object to be sliced and to move the same, and means for simultaneously imparting a revolving and reciprocating movement to the said knife and to intermittently operate the said feed rollers.

5. In a slicing machine, a table upon which the object to be sliced can rest, feeding means located below the said table and adapted to feed the object to be sliced, so that part thereof is bent at an angle to the said table, and cutting means adapted to operate along a line inclined to the said table, and means for operating the said cutting means and the said feeding means.

6. In a slicing machine, a table, feed rollers located below the said table and adapted to feed and engage with the object to be sliced, and cutting means adapted to operate in a line inclined towards the said table and to the axes of the said feeding rollers, and means to operate the said cutting means and the said feed rollers.

7. In a slicing machine the combination of a table, feed rollers located below the said table and adapted to engage and feed the object to be sliced, a circular knife mounted on a spindle located above the said table, means for moving the said spindle to and fro and simultaneously revolving it, and connections between the mounting of the said spindle and the said feed rollers whereby the said feed rollers are intermittently operated when the knife is out of contact with the object to be sliced.

8. In a slicing machine, the combination of a table, means for moving the object to be sliced forwardly upon the said table, a cross member located above the said table, a slide mounted upon the said cross member, a revoluble knife spindle having a knife thereon and carried by the said slide and means for revolving the said knife spindle.

9. In a slicing machine, the combination of a table, means for moving the object to be sliced along the said table, a cross member located above the said table, a slide having a cam pin connected thereto, a shaft having a cam groove with a plurality of turns, said cam pin being adapted to engage with the said cam groove whereby the revolutions of the said cam shaft causes the said slide to be reciprocated, the complete movement of the said slide in either direction being accomplished by a plurality of revolutions of the said cam shaft, a second revoluble shaft, a sleeve mounted upon the said slide and upon the said second shaft so that it revolves therewith, but can move longitudinally thereon, a knife spindle having a knife secured thereto and mounted upon the said slide, the said spindle being connected to the said sleeve so as to revolve therewith.

In testimony whereof he hereunto affixes his signature.

LOUIS SPISELMAN.